(12) United States Patent
Van Nee et al.

(10) Patent No.: US 8,498,363 B2
(45) Date of Patent: Jul. 30, 2013

(54) COMPENSATING FOR FREQUENCY OFFSETS ON A BASE STATION

(75) Inventors: Richard Van Nee, De Meern (NL); Gregory Steele, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 12/845,029

(22) Filed: Jul. 28, 2010

(65) Prior Publication Data

US 2011/0201282 A1 Aug. 18, 2011

Related U.S. Application Data

(60) Provisional application No. 61/305,186, filed on Feb. 17, 2010.

(51) Int. Cl.
*H04K 1/02* (2006.01)

(52) U.S. Cl.
USPC .......................................... 375/296

(58) Field of Classification Search
USPC .................... 375/267, 296, 227, 260, 285
See application file for complete search history.

(56) References Cited

U.S. PATENT DOCUMENTS

| | | | |
|---|---|---|---|
| 2002/0101840 A1* | 8/2002 | Davidsson et al. | 370/330 |
| 2003/0086508 A1 | 5/2003 | Magee | |
| 2006/0233270 A1 | 10/2006 | Ahn et al. | |
| 2007/0263712 A1* | 11/2007 | Ling et al. | 375/227 |
| 2007/0280363 A1 | 12/2007 | Im et al. | |
| 2010/0008406 A1 | 1/2010 | Sawai et al. | |
| 2010/0329236 A1* | 12/2010 | Sampath et al. | 370/350 |
| 2011/0051636 A1* | 3/2011 | Van Nee et al. | 370/310 |
| 2011/0299382 A1* | 12/2011 | Van Nee et al. | 370/210 |
| 2012/0051287 A1* | 3/2012 | Merlin et al. | 370/328 |

FOREIGN PATENT DOCUMENTS

EP 1320232 A2 6/2003

OTHER PUBLICATIONS

Al-Bayati A.K.S., et al., "Block spectral precoding for blind multiuser detection of DS/CDMA signals", IEE Proceedings: Communications, Institution of Electrical Engineers, vol. 152, No. 1, Feb. 24, 2005, pp. 95-102, XP006023433, IEE, GB ISSN: 1350-2425, DOI:10.1049/IP-COM:20040771.
International Search Report and Written Opinion—PCT/US2011/025343, ISA/EPO—Jun. 27, 2011.

* cited by examiner

*Primary Examiner* — Jaison Joseph
(74) *Attorney, Agent, or Firm* — Howard Seo

(57) ABSTRACT

A base station for compensating for frequency offsets is described. The base station includes a processor and instructions stored in memory. The base station computes a time domain impulse response estimate and applies frequency offset compensation to the time domain impulse response estimate to obtain a time domain offset-compensated impulse response estimate. A frequency domain offset-compensated impulse response estimate is computed. The frequency domain offset-compensated impulse response estimate is used to compute beamforming weights. The base station transmits data using the beamforming weights.

32 Claims, 12 Drawing Sheets

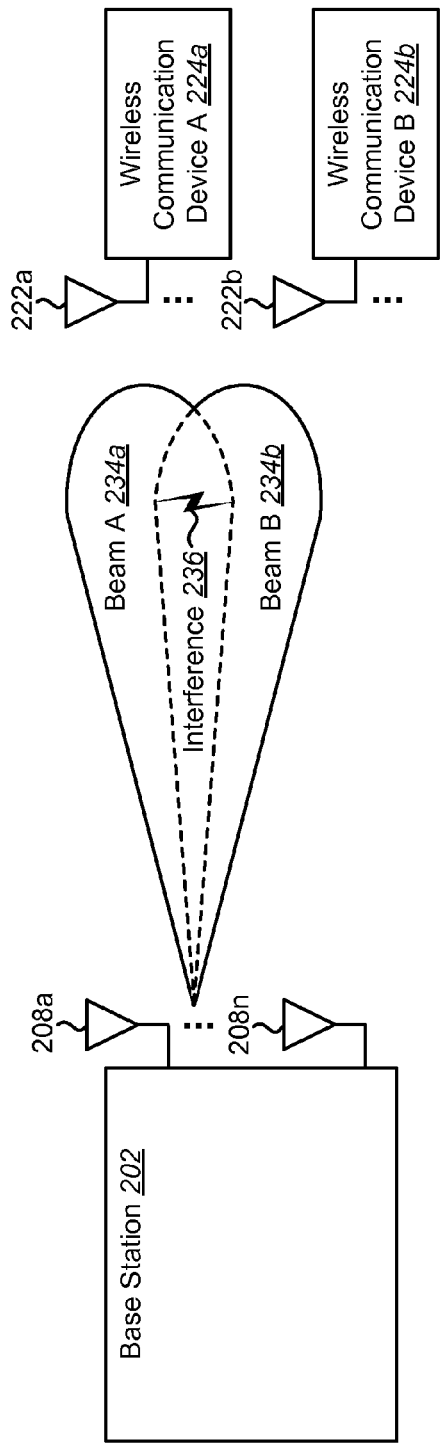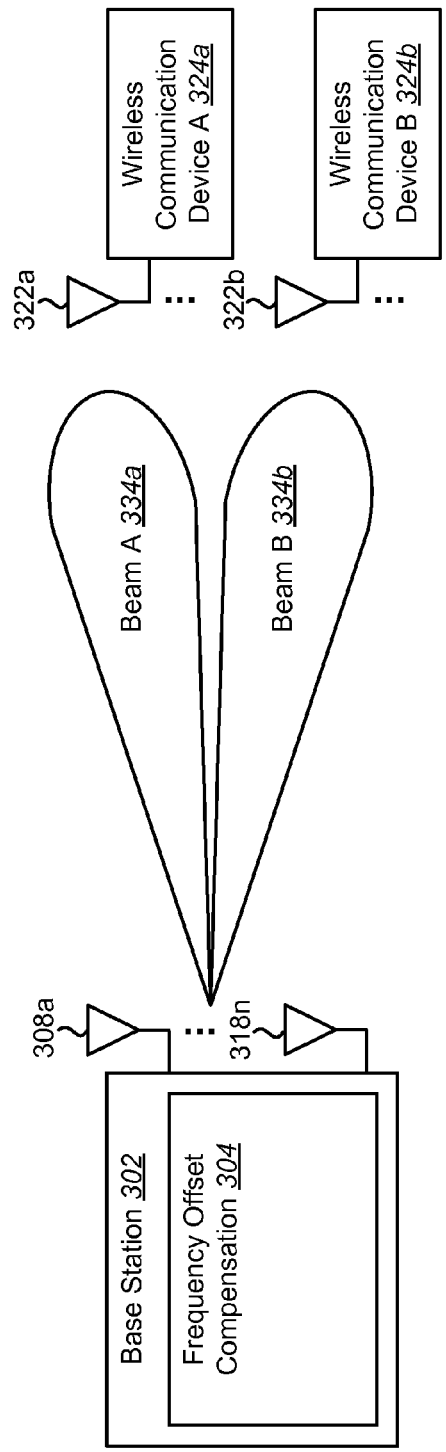

COMPENSATING FOR FREQUENCY OFFSETS ON A BASE STATION

RELATED APPLICATIONS

This application is related to and claims priority from U.S. Provisional Patent Application Ser. No. 61/305,186, entitled "COMPENSATING FOR FREQUENCY OFFSETS ON A BASE STATION," filed on Feb. 17, 2010, and incorporated herein by reference in its entirety.

TECHNICAL FIELD

The present disclosure relates generally to communication systems. More specifically, the present disclosure relates to compensating for frequency offsets on a base station.

BACKGROUND

Wireless communication systems are widely deployed to provide various types of communication content such as data, voice, video, and so on. These systems may be multiple-access systems capable of supporting simultaneous communication of multiple wireless communication devices with one or more base stations.

Use of these base stations has dramatically increased over the past few years. Base stations often provide access to a network, such as a Local Area Network (LAN) or the Internet, for example. Users of wireless communication devices often connect to networks using such base stations. Users may desire to wirelessly connect multiple wireless communication devices to a single base station. Furthermore, users may also desire faster and more reliable throughput via wireless communication devices. Thus, increases in throughput and reliability on base stations are being sought.

When multiple wireless communication devices attempt to connect to a single base station, however, particular difficulties may arise. For example, the signals transmitted to or received from multiple wireless communication devices may interfere, causing degraded system performance. This may particularly occur when the wireless communication devices are not adequately synchronized with the base station. For this reason, improved systems and methods for reducing interference between wireless communication devices may be beneficial.

BRIEF DESCRIPTION OF THE DRAWINGS

FIG. 2 is a block diagram illustrating one example of interference between Spatial Division Multiple Access (SDMA) beamforms;

FIG. 3 is a block diagram illustrating one example of SDMA beamforms with frequency offset compensation;

DETAILED DESCRIPTION

Figure 1:
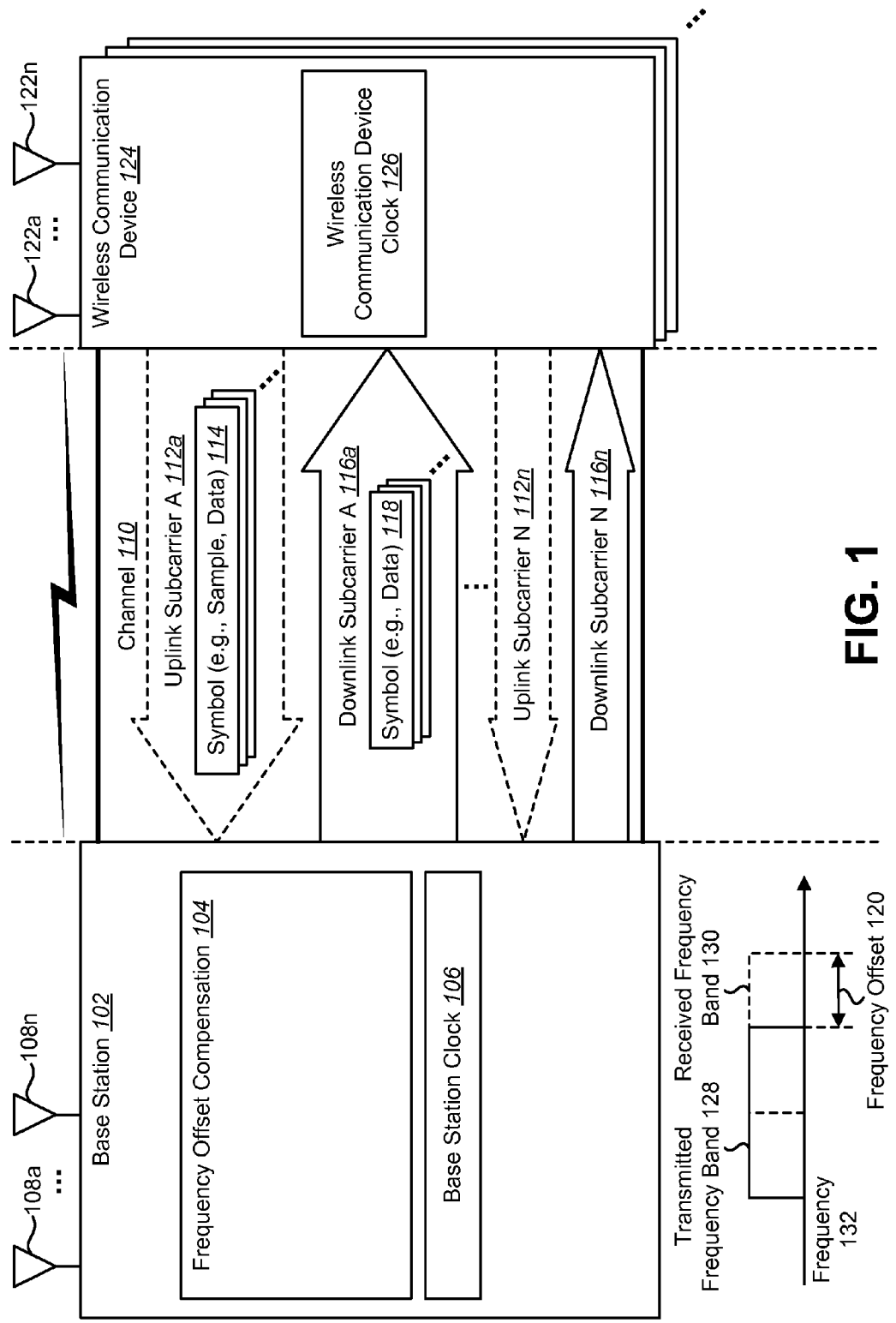
FIG. 1 is a block diagram illustrating one configuration of a base station in which systems and methods for compensating for frequency offsets on a base station may be implemented.

A base station for compensating for frequency offsets is disclosed. The base station includes a processor and instructions stored in memory. The base station computes a time domain impulse response estimate and applies frequency offset compensation to the time domain impulse response estimate to obtain a time domain offset-compensated impulse response estimate. The base station also computes a frequency domain offset-compensated impulse response estimate and computes beamforming weights using the frequency domain offset-compensated impulse response estimate. The beamforming weights are used to form at least one beam, which is used to transmit data.

The beamforming weights may be used for Spatial Division Multiple Access (SDMA) and the data may be transmitted to one or more access terminals. The base station may be an access point and may include one or more antennas. The base station may also discover one or more wireless communication devices. The base station may also receive one or more channel samples with one or more frequency offsets.

Computing a time domain impulse response estimate may include multiplying the inverse of the Hermitian of a Fast Fourier Transform (FFT) matrix multiplied by the FFT matrix plus a constant multiplied by an identity matrix with the Hermitian of the FFT matrix and received channel samples. Applying frequency offset compensation to the time domain impulse response estimate may include multiplying the time domain impulse response estimate by an exponential function including a frequency offset.

Computing a frequency domain offset-compensated impulse response estimate may include multiplying the time domain offset-compensated impulse response estimate with a Fast Fourier Transform (FFT) matrix. Computing the time domain impulse response estimate may include multiplying the inverse of the Hermitian of a Fast Fourier Transform (FFT) matrix multiplied by the FFT matrix plus a constant multiplied by an identity matrix with an Inverse Fast Fourier Transform (IFFT) matrix and received channel samples.

Computing a time domain impulse response estimate may include taking an Inverse Fast Fourier Transform (IFFT) of received channel samples multiplied by a windowing function. Applying frequency offset compensation to the time domain impulse response estimate may include multiplying the time domain impulse response estimate by an exponential function including a frequency offset and sample shift to obtain a sample-shifted time domain impulse response.

Computing the frequency domain offset-compensated impulse response estimate may include computing a sample-shifted frequency domain impulse response estimate by taking the Fast Fourier Transform (FFT) of the sample-shifted time domain impulse response, computing a sample-shifted frequency domain window by taking the FFT of the IFFT of the windowing function multiplied by the exponential function including a frequency offset and sample shift and computing a frequency domain offset-compensated impulse response estimate for windowing by dividing the sample-shifted frequency domain impulse response by the sample-shifted frequency domain window.

Alternatively, computing the frequency domain offset-compensated impulse response estimate may include computing a sample-shifted frequency domain impulse response estimate by taking the Fast Fourier Transform (FFT) of the sample-shifted time domain impulse response, computing a sample-shifted frequency domain window by taking the FFT of the IFFT of the windowing function multiplied by the exponential function including a frequency offset and sample shift and computing a frequency domain offset-compensated impulse response estimate for windowing by dividing the sample-shifted frequency domain impulse response by the magnitude of the sample-shifted frequency domain window.

A method for compensating for frequency offsets on a base station is disclosed. The method includes computing a time domain impulse response estimate on the base station and applying frequency offset compensation to the time domain impulse response estimate to obtain a time domain offset-compensated impulse response estimate. The method further includes computing a frequency domain offset-compensated impulse response estimate on the base station and computing beamforming weights using the frequency domain offset-compensated impulse response estimate. The method also includes forming at least one beam using the beamforming weights on the base station and transmitting data from the base station using the at least one beam.

A computer-program product for compensating for frequency offsets on a base station is disclosed. The computer-program product includes a non-transitory computer-readable medium having instructions thereon. The instructions include code for computing a time domain impulse response estimate and applying frequency offset compensation to the time domain impulse response estimate to obtain a time domain offset-compensated impulse response estimate. The instructions further include code for computing a frequency domain offset-compensated impulse response estimate and computing beamforming weights using the frequency domain offset-compensated impulse response estimate. The instructions further include code for forming at least one beam using the beamforming weights and transmitting data using the at least one beam.

An apparatus for compensating for frequency offsets is also disclosed. The apparatus includes means for computing a time domain impulse response estimate and applying frequency offset compensation to the time domain impulse response estimate to obtain a time domain offset-compensated impulse response estimate. The apparatus also includes means for computing a frequency domain offset-compensated impulse response estimate and computing beamforming weights using the frequency domain offset-compensated impulse response estimate. The apparatus also includes means for forming at least one beam using the beamforming weights and transmitting data using the at least one beam.

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers, for example. A base station (e.g., access point) may operate in accordance with certain industry standards, such as the Institute of Electrical and Electronics Engineers (IEEE) 802.11a, 802.11b, 802.11g, 802.11n, 802.11ac (e.g., Wireless Fidelity or "Wi-Fi") standards. Other examples of standards that an access point may comply with include IEEE 802.16 (e.g., Worldwide Interoperability for Microwave Access or "WiMAX"), Third Generation Partnership Project (3GPP), 3GPP Long Term Evolution (LTE) and others (e.g., where a base station may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

As used herein, the term "wireless communication device" generally denotes a communication device (e.g., access terminal, client device, etc.) that may wirelessly connect to a base station. A wireless communication device may alternatively be referred to as a mobile device, a mobile station, a subscriber station, a user equipment, a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards as described above in connection with base stations. Thus, the general term "wireless communication device" may include wireless communication devices described with varying nomenclatures according to industry standards (e.g., access terminal, user equipment (UE), remote terminal, etc.).

As used herein, the terms "compensate," "compensation," "compensate for," "correct," "correction," "correct for," and other forms of "compensate" or "correct" indicate some level of compensation or correction. That is, the terms may indicate some reduction of offsets/errors or at least some action taken in an effort to reduce offsets/errors. In other words, compensating for frequency offsets or errors may only reduce the frequency offsets or errors. Thus, some amount of frequency offsets or errors may remain after "compensation" or "correction."

As described above, improved throughput and reliability on a base station may be beneficial. One approach to improving throughput on a base station involves using beamforming. Beamforming may be used in the context of Spatial Division Multiple Access (SDMA). SDMA is a technique that spatially divides transmit signals, which may allow communication resources (e.g., time and/or frequency resources) to be "reused." Beamforming may be implemented using multiple antennas by controlling the relative signal phase and amplitude at each antenna. Such control allows a transmit signal to be spatially aimed in a particular direction. SDMA may be used in a Multi-User Multiple-Input Multiple-Output (MU-MIMO context). The systems and methods disclosed herein describe techniques that may be used to compensate channel estimates in SDMA for different frequency offsets per access terminal (e.g., "client"). More specifically, the systems and methods disclosed herein apply to transmitted downlink beamforming using implicit feedback (i.e., received uplink preambles may be used to estimate downlink beamforming weights).

Frequency offset compensation may be relevant to the operation of particular standards. For example, frequency offset compensation may be applied to IEEE 802.11ac modes using implicit channel state information without a frequency synchronization requirement for wireless communication devices (e.g., client devices). It may also apply for using SDMA for wireless communication devices operating according to "legacy" standards IEEE 802.11a or 802.11n. It should be noted that other approaches may be used to reduce frequency offsets. For example, a wireless communication system might use explicit feedback. However, that approach may cost more overhead and may not work for certain "legacy" wireless communication devices that do not support explicit feedback (e.g., IEEE 802.11a or 802.11n clients). Another approach for reducing frequency offsets may be when a wireless communication system requires all wireless communication devices to synchronize their transmit (TX) clocks to a base station clock. However, this approach may also not work for certain legacy wireless communication devices (e.g., IEEE 802.11a or 802.11n clients) that do not support this functionality. On the other hand, the systems and methods disclosed herein may operate to compensate for frequency offsets without explicit feedback or clock synchronization.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a base station 102 in which systems and methods for compensating for frequency offsets on a base station 102 may be implemented. A base station 102 may communicate with one or more wireless communication devices 124 across a channel 110. For example, the base station 102 may transmit radio frequency (RF) signals to the one or more wireless communication devices 124 using multiple antennas 108a-n. The one or more wireless communication devices 124 may each receive the transmitted signals using one or more antennas 122a-n. Conversely, the wireless communication devices 124 may transmit signals that may be received by the base station 102. Signals transmitted from the base station 102 to the wireless communication devices 124 may generally be referred to as downlink signals, while signals transmitted from the wireless communication devices 124 to the base station may be referred to as uplink signals.

The base station 102 may transmit one or more modulated symbols (e.g., data) 118 to the wireless communication devices 124 using one or more downlink subcarriers 116a-n. Conversely, the wireless communication devices 124 may transmit one or more modulated symbols (e.g., samples, data) 114 using one or more uplink subcarriers 112a-n. A carrier may generally include a range of frequencies or bandwidth used to transmit symbols 114, 118 across the channel 110. A subcarrier 112, 116 may be a frequency band included within a carrier. In one configuration (e.g., using orthogonal frequency-division multiplexing or OFDM), one or more subcarriers 112, 116 may be orthogonal to each other and collectively occupy the carrier bandwidth. Each subcarrier 112, 116 may carry a separate stream of symbols or data, for example.

The base station 102 may include a base station clock 106 used to generate downlink subcarrier 116 frequencies. A wireless communication device clock 126 may be similarly used by the wireless communication device 124 to generate uplink subcarrier 112 frequencies. However, the wireless communication device clock 126 may not be exactly synchronized with the base station clock 106. When the base station clock 106 and wireless communication device clock 126 are not exactly synchronized, frequency offsets 120 may occur. Each wireless communication device 124 may have a different frequency offset 120.

As will be discussed in more detail below, it may be desirable for corresponding subcarriers 112, 116 to align in frequency. For example, system performance may be improved when uplink subcarrier A 112a and downlink subcarrier A 116a are aligned on the same frequency. However, because the base station clock 106 and wireless communication device clocks 126 may not be exactly synchronized, the subcarrier frequencies 112a, 116a may not be exactly aligned, causing the frequency offset 120 and possibly degrading system performance.

This effect is illustrated on a frequency axis 132 below the base station 102 in FIG. 1. A base station 102 transmits a signal in a transmitted frequency band 128 (e.g., a downlink subcarrier 116), but receives a signal (e.g., an uplink subcarrier 112) in a received frequency band 130. As illustrated, the transmitted frequency band 128 and the received frequency band 130 are offset by the frequency offset 120. When SDMA beamforming weights are based on channel estimates from received uplink preambles (e.g., from symbols 114, each with a different frequency offset 120), interference in the SDMA downlink may occur because the downlink channel is at different subcarrier frequencies (e.g., the transmitted frequency band 128) than the received uplink channels (e.g., the received frequency band 130).

The base station 102 may include a frequency offset compensation module 104. The frequency offset compensation module 104 may use received symbols (e.g., samples, data) 114 to implicitly compensate for the frequency offset 120. More specifically, the base station 102 may use implicit channel information (e.g., message preambles from the received symbols 114) to compensate for frequency offsets 120 in order to perform SDMA beamforming. That is, the base station 102 may compensate for the frequency offset 120 when computing SDMA beamforming weights. The channel information is deemed "implicit" as the information is not "explicit" feedback intended to compensate for the frequency offset 120. The systems and methods disclosed herein describe how a base station 102 may compensate for the frequency offset 120 using implicit channel estimates.

Since each wireless communication device 124 (e.g., "client") may have a different frequency offset 120, SDMA channels may be sampled at different frequencies. The base station 102 may compensate for the frequency offset 120 in order to avoid creating or reduce multi-user interference. When there is only one wireless communication device 124, the base station 102 may either shift its transmit signal frequency by the frequency offset 120 or ignore the frequency offset (e.g., since the effect of single-user beamforming performance may be small).

FIG. 2 is a block diagram illustrating one example of interference between SDMA beams. A base station 202 may include multiple antennas 208a-n. As discussed above, the base station 202 may control relative phase and amplitude between signals transmitted on the antennas 208a-n in order to perform beamforming. For example, the base station 202 may generate beam A 234a, spatially aimed at wireless communication device A 224a. The base station 202 may also generate beam B 234b, which is spatially aimed at wireless communication device B 224b. Wireless communication device A 224a and wireless communication device B 224b may respectively use one or more antennas 222a-b to receive signals from the base station 202. The example shown in FIG. 2 illustrates that interference 236 may occur if the base station 202 does not adequately compensate for frequency offsets 120. In this case, a frequency offset 120 has caused beam A 234a and beam B 234b to spatially overlap. This may cause wireless communication device A 224a to receive a portion of signal energy being transmitted on beam B 234b, resulting in interference 236. Thus, if frequency offsets 120 are not adequately compensated for in the context of SDMA, beamforms 234 may spatially overlap, causing interference between wireless communication devices 224.

However, there are more general SDMA cases where there may be spatial overlap, though no interference 236 occurs between the spatial streams (e.g., beams 234) of interest for each wireless communication device 224. For instance, a base station 202 may beamform to three wireless communication devices 224 that each have two antennas 222, but each wireless communication device is assigned one spatial stream (e.g., beam 234). In this case, all of the antennas 222 may receive signals intended for all wireless communication devices 224. However, after applying a spatial filter at a wireless communication device 224, the wireless communication device 224 may "see" the spatial stream intended for him without any interference if the beamforming was done perfectly. Thus, in general, there is interference 236 between spatial streams if SDMA weights are not ideal.

FIG. 3 is a block diagram illustrating one example of SDMA beamforms with frequency offset compensation. In this example, the base station 302 includes multiple antennas 308a-n and a frequency offset compensation module 304. The wireless communication devices 324a-b may respectively include one or more antennas 322a-b. As was similarly described in connection with FIG. 2, the base station 302 generates beam A 334a and beam B 334b, which are spatially directed to wireless communication device A 324a and wireless communication device B 324b, respectively. However, in this example, the base station 302 has compensated for frequency offsets 120 using the frequency offset compensation module 304. As a result, beam A 334a and beam B 334b are more spatially distinct. This may result in reduced interference 236.

For example, wireless communication device A 324a may receive less signal energy being transmitted in beam B 334b, resulting in reduced interference or noise from beam B 334b. Thus, interference 236 between the wireless communication devices 324a-b may be reduced or avoided. Because the beamforms 334a-b are more spatially distinct, the base station 302 may use similar time and frequency resources for both wireless communication devices 324a-b, thereby increasing throughput. Furthermore, signals may be more reliably received at the wireless communication devices 324a-b as there may be less noise in the signal, providing a higher Signal to Noise Ratio (SNR). This may allow higher modulation and/or data rates (e.g. 64 Quadrature Amplitude Modulation (QAM), code rate 5/6, etc.) to be used by the base station 302.

Figure 4:
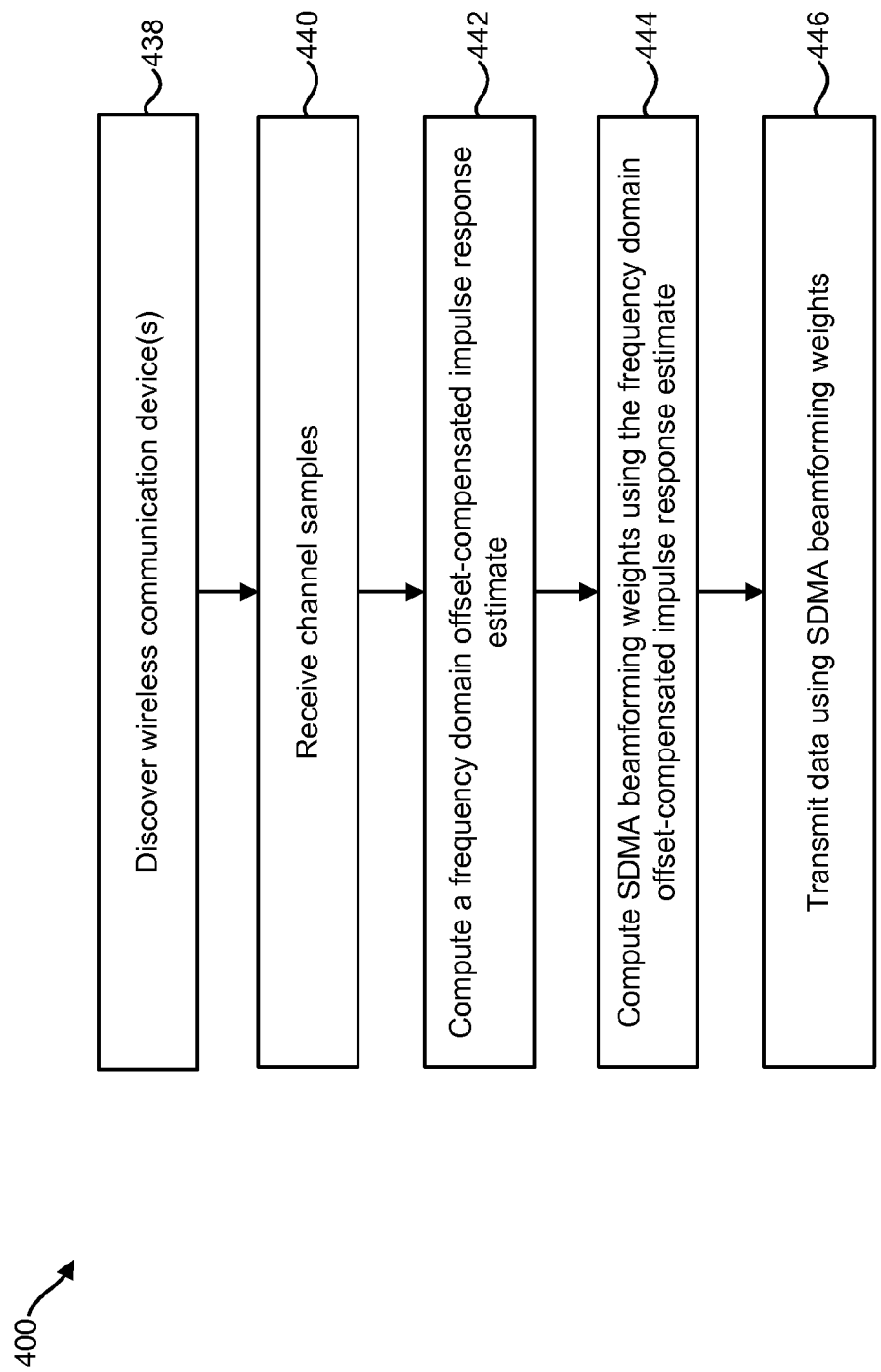
FIG. 4 is a flow diagram illustrating one configuration of a method for compensating for frequency offsets on a base station.

FIG. 4 is a flow diagram illustrating one configuration of a method 400 for compensating for frequency offsets on a base station 102. A base station 102 may discover 438 one or more wireless communication devices 124. For example, a base station 102 may receive a message from a wireless communication device 124 requesting access to base station 102 resources (e.g., a network connection, Internet connection via the base station 102, etc.). The wireless communication device 124 may also advertise what its capabilities are (e.g., whether it can support explicit feedback). The base station 102 may also receive 440 channel samples including frequency offsets. In other words, the wireless communication device 102 may receive one or more symbols 114 (e.g., a message preamble). The base station 102 may use these received 440 channel samples to compute 442 an offset-compensated impulse response estimate 120 (e.g., in the frequency domain). That is, one objective of the systems and methods disclosed herein may be to estimate (e.g., using interpolation) a frequency-domain channel impulse response based on received channel samples. The frequency domain offset-compensated impulse response estimate may then be used to compute 444 beamforming weights. The beamforming weights may be applied in the context of SDMA. For example, the base station 102 may compute 444 a beamforming matrix using the impulse response estimate (e.g., a frequency domain offset-compensated impulse response estimate). The base station 102 may then transmit 446 data using the computed (e.g., SDMA) beamforming weights. More specifically, the base station 102 may use the impulse response estimate to compute beamforming weights. The beamforming weights may affect the relative signal phase and/or amplitudes between antennas and may be used to form one or more beams (e.g., directional beams). The one or more beams may be used to transmit data.

For example, assume that two wireless communication devices 124 are communicating with a base station 102. Each wireless communication device has a single antenna 122 and the base station 102 has four antennas 108. Estimated channel impulse responses $H_{est,\ 1}$ and $H_{est,\ 2}$ may be computed 442 for two uplinks, where $H_{est,\ 1}$ and $H_{est,\ 2}$ are 4×1 vectors. An overall downlink channel may be written as $H=[H_{est,\ 1}\ H_{est,\ 2}]^T$, where H is a 2×4 matrix and T denotes a matrix transpose. One possible way to do SDMA beamforming is to compute 444 a Minimum Mean Square Error (MMSE) beamforming weight matrix $W=(\alpha I+HH^*)H^*$, where $H^*$ is the conjugated transpose of H, I is a 2×2 identity matrix and α is a scalar factor or constant. For example, α may be equal to 1 divided by an estimated signal-to-noise ratio (SNR) in the received uplink. Alternatively, α may be set smaller to be closer to zero-forcing. The beamforming weight matrix W may applied to a transmit signal. Thus, data may be transmitted 446 using SDMA beamforming weights.

Figure 5:
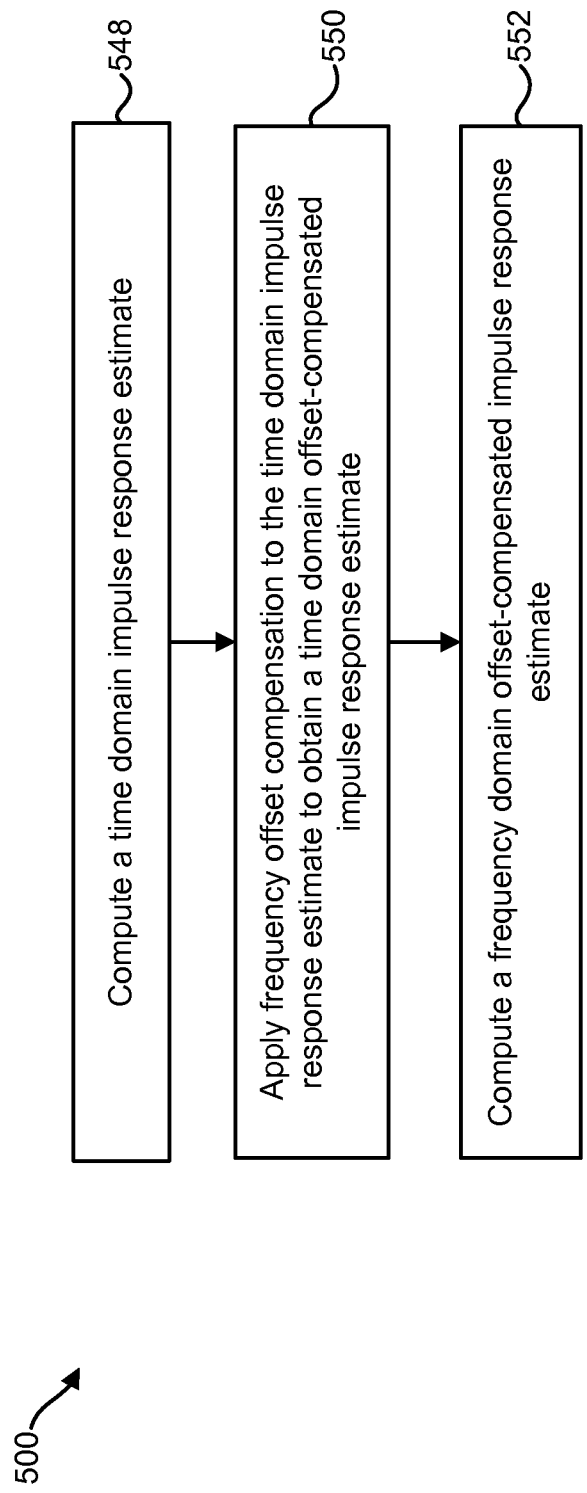
FIG. 5 is a flow diagram illustrating another configuration of a method for compensating for frequency offsets on a base station.

FIG. 5 is a flow diagram illustrating one configuration of a method 500 for computing an offset-compensated impulse response estimate. A base station 102 may compute 548 a time domain (i.e., channel) impulse response estimate (e.g., including a frequency offset 120). For example, the base station 102 may receive frequency domain channels that the base station 102 may shift in frequency. According to some of the algorithms described herein, this may be done by converting a channel into the time domain. However, this procedure may also be described as a frequency-domain interpolation. As discussed above, each wireless communication device 124 may have a different frequency offset 120. Because there may be multiple wireless communication devices 124, a single frequency shift may not resolve all of the frequency offsets 120. Thus, individual channels from individual wireless communication devices 124 may need to be shifted in frequency.

The base station 102 may apply 550 frequency offset compensation to the time domain impulse response estimate to obtain a time domain offset-compensated impulse response estimate. For example, an estimate of the frequency offset 120 may be obtained using known frequency offset 120 estimation techniques (e.g., using the first long training symbol of an IEEE 802.11a/n packet). This may be used to compensate for the frequency offset(s) 120 in the time domain impulse response estimate. The base station 102 may compute 552 a frequency-domain offset-compensated impulse response estimate.

Figure 6:
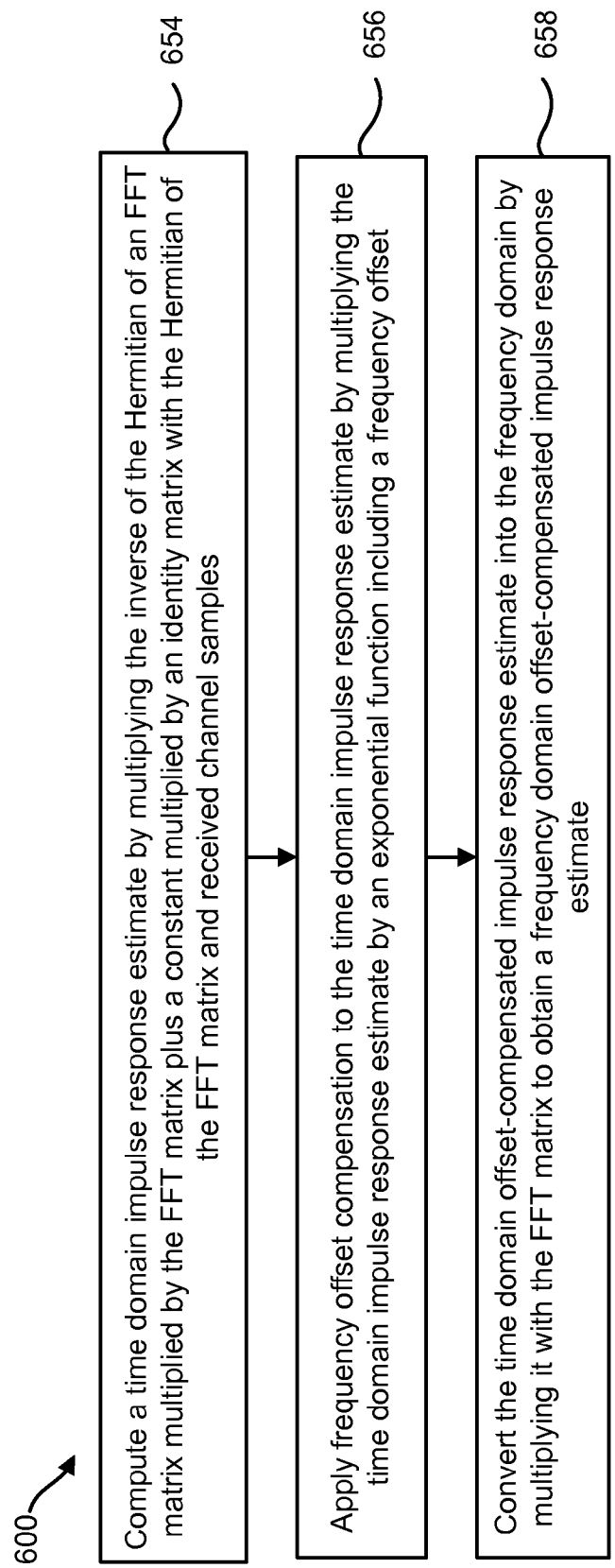
FIG. 6 is a flow diagram illustrating another configuration of a method for compensating for frequency offsets on a base station.

FIG. 6 is a flow diagram illustrating a more specific configuration of a method 600 for computing an offset-compensated impulse response estimate. The method 600 represents an approach to compensating for frequency offsets 120 using minimum mean square error—(MMSE) based interpolation. This and other approaches may be used since simple interpolation techniques such as linear interpolation may not be sufficient to keep errors below −40 decibels relative to the carrier (dBc). A base station 102 may compute 654 a time domain impulse response estimate by multiplying the inverse of the Hermitian of a Fast Fourier Transform (FFT) matrix multiplied by the FFT matrix plus a constant multiplied by an identity matrix with the Hermitian of the FFT matrix and received channel samples. This operation may be performed as illustrated in Equation (1).

$$h_s = (F_{ij}^H F_{ij} + \alpha I_L)^{-1} F_{ij}^H H(f_k + \Delta f) \quad (1)$$

$h_s$ is a time domain impulse response estimate vector including a frequency offset $\Delta f$ 120 of length $L \leq N_s$, where $N_s$ is a total number of subcarriers. $F_{ij}$ is an N-point FFT matrix and $F_{ij}^H$ is the Hermitian of the FFT matrix, where N is the nearest power of 2 larger than the total number of subcarriers $N_s$. i represents the row indices of the FFT matrix, where i=((k+N)mod N). k is the subcarrier index number, while $f_k$ is the subcarrier frequency at index number k. The column indices j={0, 1, ..., L}, where L is the length of the impulse response. $\alpha$ is a constant (e.g., $\alpha$=0.0001) and $I_L$ is an identity matrix with dimensions L×L. In one configuration, $\alpha$ may be experimentally determined in order to get improved accuracy in the resulting interpolated channel estimates. If $\alpha$ is 0 or is too large, inaccuracies and/or noise enhancement may result, particularly at the band edges. Received channel samples may be written as $H(f_k+\Delta f)=F_{ij}h_s+n$, where n is a vector of $N_s$ noise samples. It should be noted that $\Delta f$ may be a single frequency offset 120 for a single wireless communication device 124. As discussed herein, there may be a different frequency offset $\Delta f$ 120 for each wireless communication device 124. The operations illustrated by equations herein may be used for the frequency offset $\Delta f$ 120 for a single wireless communication device 124. However, each different offset $\Delta f$ 124 may be processed independently. In other words, the systems and methods disclosed herein may perform operations as illustrated by the equations independently (e.g., repeatedly) for each wireless communication device 124.

In one example, a "legacy" base station 102 operates in accordance with IEEE 802.11n. "Legacy" denotes a device that conforms to an "older" standard, such as IEEE 802.11a or IEEE 802.11n, as opposed to a "current" standard, such as IEEE 802.11ac. In this example, the base station 102 may transmit downlink SDMA packets at subcarrier frequencies $f_k=f_c+k\cdot 312.5$ kHz (i.e., kHz is kilohertz, MHz is megahertz, etc.). The subcarrier indices k={−28, −27, ..., −1, 1, 2, ..., 28} (e.g., in a 20 MHz frequency band). The Radio Frequency (RF) center frequency $f_c$=5240 MHz, for example. The base station 102 may receive uplink packets from non-synchronized legacy wireless communication devices 124 at subcarrier frequencies $f_c+k\cdot 312.5$ kHz+$\Delta f$, where $\Delta f$ is a frequency offset 120 up to ±40 parts per million (ppm).

The base station 102 may apply 656 frequency offset 120 compensation to the time domain impulse response estimate by multiplying the time domain impulse response estimate by an exponential function including a frequency offset 120. This operation may be performed as illustrated in Equation (2).

$$h(k) = h_s(k) \exp\left(\frac{-j 2\pi k \Delta f}{N}\right) \quad (2)$$

h(k) is the time domain offset-compensated impulse response estimate and j is the imaginary unit (i.e., j=√−1 in this context (e.g., Equations (2), (6) and (8))).

The base station 102 may convert 658 (e.g., compute) the time domain offset-compensated impulse response estimate into the frequency domain by multiplying it with the FFT matrix. This operation may be performed as illustrated in Equation (3).

$$H_{est} = F_{ij} h \quad (3)$$

$H_{est}$ is the frequency domain offset-compensated impulse response estimate. In one example with a 150 kHz frequency offset (e.g., using $\alpha$=0.0001), the channel impulse response error magnitude (e.g., $|H(f_k) - H_{est}(f_k)|$) was reduced to a Root Mean Squared (RMS) error of −57 dBc with a maximum error of −43 dBc.

Figure 7:
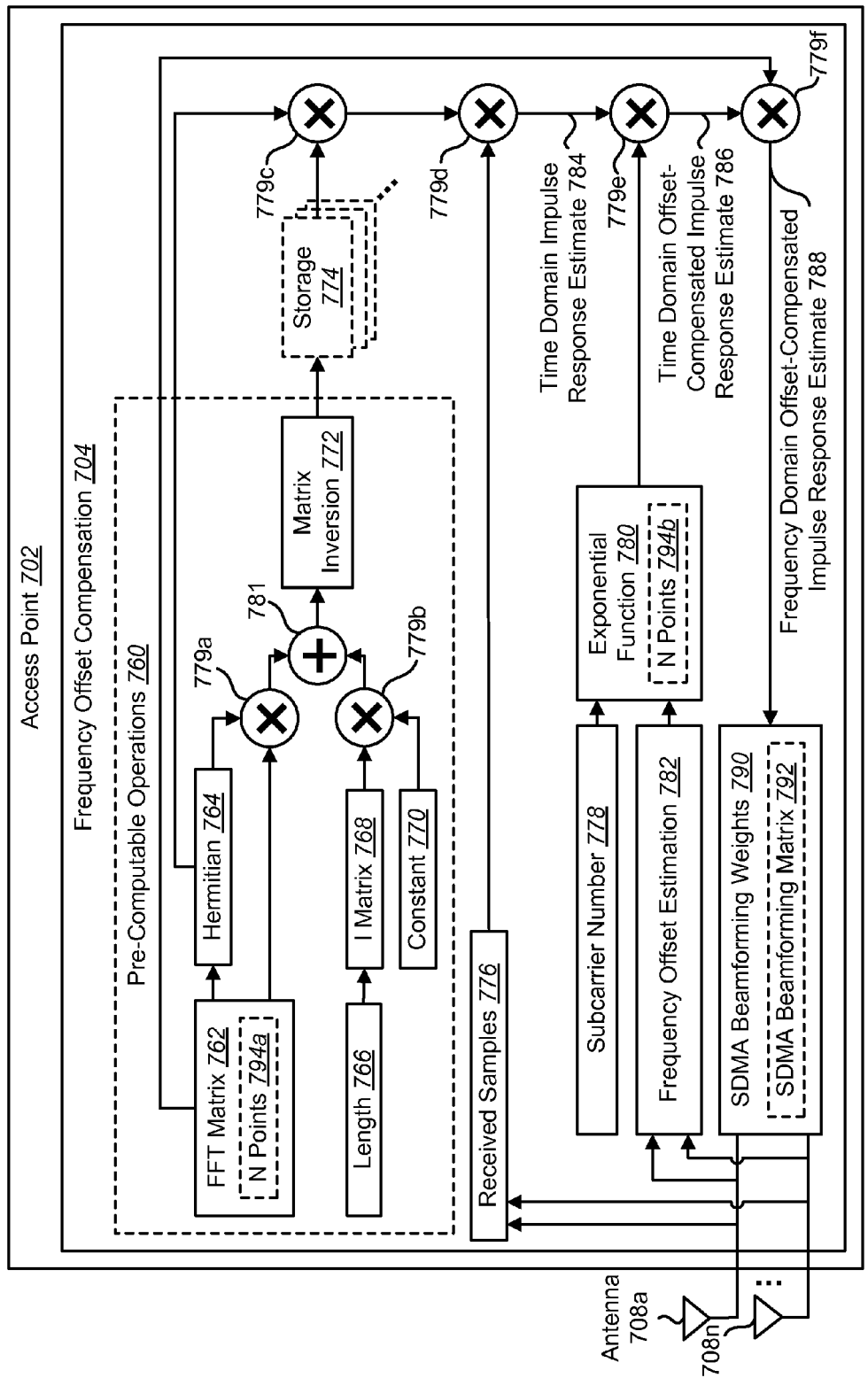
FIG. 7 is a block diagram illustrating one configuration of an access point where systems and methods for compensating for frequency offsets on a base station may be implemented.

FIG. 7 is a block diagram illustrating one configuration of an access point 702 where systems and methods for compensating for frequency offsets on a base station 102 may be implemented. In particular, FIG. 7 illustrates one implementation of the method 600 discussed in connection with FIG. 6. An access point 702 may include a frequency offset compensation module 704.

The frequency offset compensation module 704 may include an identity matrix 768 (e.g., I) of a certain length 766 (e.g., L). The identity matrix 768 may be multiplied 779b by a constant 770 (e.g., $\alpha$). The frequency offset compensation module 704 may include an FFT matrix 762. The FFT matrix 762 may be an N-point 794a FFT matrix. The access point 702 may compute the Hermitian 764 of the FFT matrix 762 and multiply 779a it by the FFT matrix 762. This product may be added 781 to the product of the identity matrix 768 and the constant 770. The resulting sum may be inverted by the matrix inversion module 772.

The resulting inverted matrix (e.g., $(F_{ij}^H F_{ij} + \alpha I_L)^{-1}$) may be deemed a "pre-computable matrix" or include "pre-computable coefficients" and may optionally be stored in storage 774. This pre-computable matrix may be the result of pre-computable operations 760. More specifically, the pre-computable matrix may optionally be pre-computed and pre-stored in storage 774, for example, before the access point 702 attempts to communicate with an access terminal (e.g., wireless communication device) 124. Additionally, the pre-computable operations 760 may be performed on the access point 702 or on some other separate computing device with the resulting pre-computable matrix being placed in storage 774 for use when the access point 702 is communicating with an access terminal.

Several different modes may be pre-stored in storage 774. In one configuration, for example, there may be 2 matrices (e.g., pre-computable matrices). One matrix may be stored for a 20 MHz mode, while another matrix may be stored for a 40 MHz mode. More specifically, the length 766 may be 20

(e.g., L=20) for the 20 MHz mode and may be 32 (e.g., L=32) for the 40 MHz mode. This may mean, for example, that the 40 MHz matrix has 1024 entries. Thus, such matrix storage and multiplication may result in added hardware complexity.

Alternatively, the pre-computable operations 760 may not be performed beforehand and/or stored, but may be performed when the access point 702 is communicating with an access terminal. The pre-computable matrix may be multiplied 779c with the Hermitian 764 of the FFT matrix 762 (e.g., $F_{ij}^H$) and multiplied 779d with the received samples 776 (e.g., $H(f_k+\Delta f)$) in order to produce a time domain impulse response estimate 784 (e.g., $h_s$). The foregoing operations may be performed as illustrated by Equation (1) above.

The access point 702 may receive samples 776 (e.g., from one or more access terminals) using one or more antennas 708a-n. A frequency offset estimation module 782 may compute one or more frequency offset estimates (e.g., $\Delta f$) using the received samples 776. An exponential function 780

$$\left(e.g., \exp\left(\frac{-j2\pi k\Delta f}{N}\right)\right)$$

may use the one or more frequency offset estimates, subcarrier numbers 778, and N points 794b. The output of the exponential function 780 may be multiplied 779e with the time domain impulse response estimate 784 to produce a time domain offset-compensated impulse response estimate 786 (e.g., h(k)). These operations may be performed as illustrated by Equation (2) above.

The time domain offset-compensated impulse response estimate 786 may be multiplied 779f with the FFT matrix 762 in order to produce a frequency domain offset-compensated impulse response estimate 788 (e.g., $H_{est}$). This operation may be illustrated by Equation (3) above. The frequency domain offset-compensated impulse response estimate 788 may be used to compute SDMA beamforming weights 790. For example, an SDMA beamforming matrix 792 may be computed using the frequency domain offset-compensated impulse response estimate 788. The SDMA beamforming weights 790 may be used to control signals transmitted to the access terminals using the antennas 708a-n.

Figure 8:
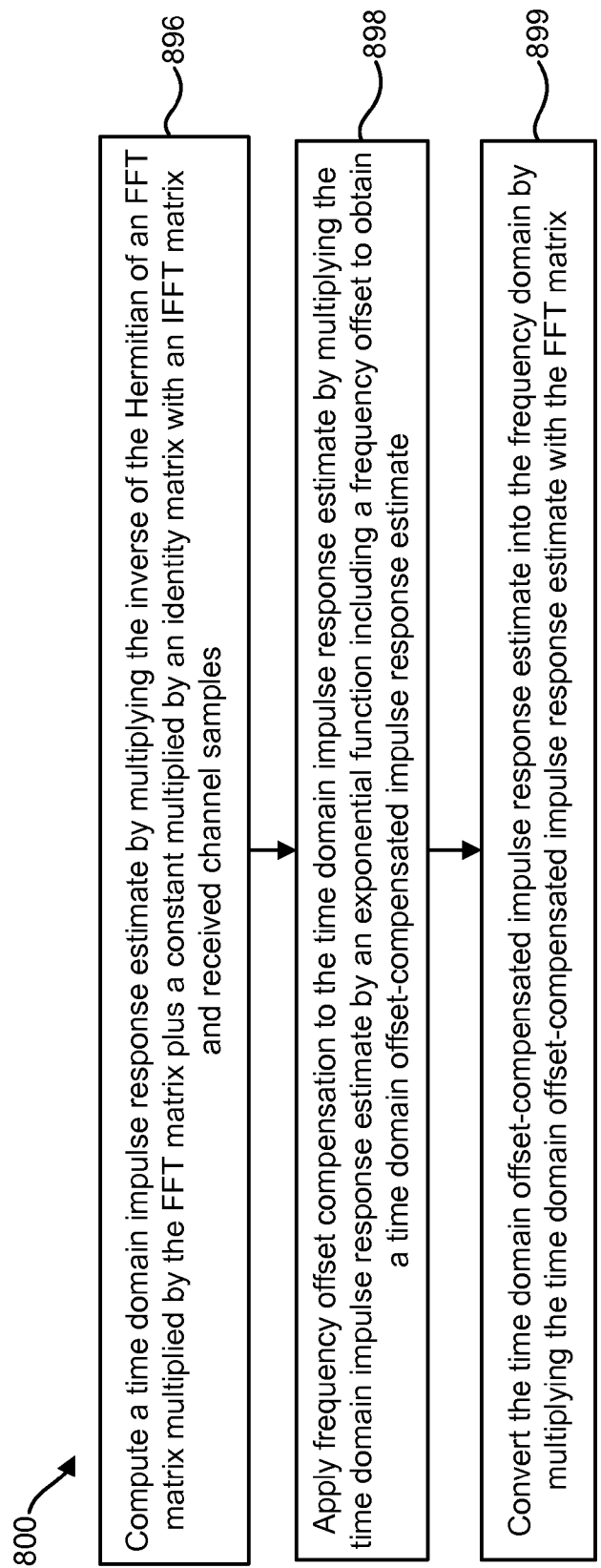
FIG. 8 is a flow diagram illustrating another configuration of a method for compensating for frequency offsets on a base station.

FIG. 8 is a flow diagram illustrating another more specific configuration of a method 600 for computing an offset-compensated impulse response estimate. The method 800 represents an approach to compensating for frequency offsets 120 using a minimum mean square error approach using N-point FFTs and a Gibbs correction matrix. A base station 102 may compute 896 a time domain impulse response estimate by multiplying the inverse of the Hermitian of an FFT matrix multiplied by the FFT matrix plus a constant multiplied by an identity matrix with an Inverse Fast Fourier Transform (IFFT) matrix and received channel samples. These operations may be illustrated by Equation (4).

$$h_s=(F_{ij}^H F_{ij}+\alpha I_L)^{-1}F^{-1}H(f_k+\Delta f) \quad (4)$$

$F^{-1}$ is an N-point IFFT matrix.

The base station 102 may apply 898 frequency offset compensation to the time domain impulse response estimate by multiplying the time domain impulse response estimate (e.g., $h_s$) by an exponential function $$\left(e.g., \exp\left(\frac{-j2\pi k\Delta f}{N}\right)\right)$$

including a frequency offset (e.g., $\Delta f$). This operation may be similarly performed as illustrated by Equation (2) above.

The base station 102 may convert 899 (e.g., compute) the time domain offset-compensated impulse response into the frequency domain according to the equation $H_{est}$=Fh. It should be noted that F is a full size N×N Fourier matrix, such that a conventional FFT or IFFT may be used to calculate this matrix multiplication. It should also be noted that the received channel H may not have a number of subcarriers that is a power of 2. In this case, zeros may be placed on the "unused" subcarriers before calculating the N-point IFFT or FFT. In one configuration, only the output subcarriers i=((k+)mod N) may be used (e.g., to compute SDMA beamforming weights), while others may be ignored.

Figure 9:
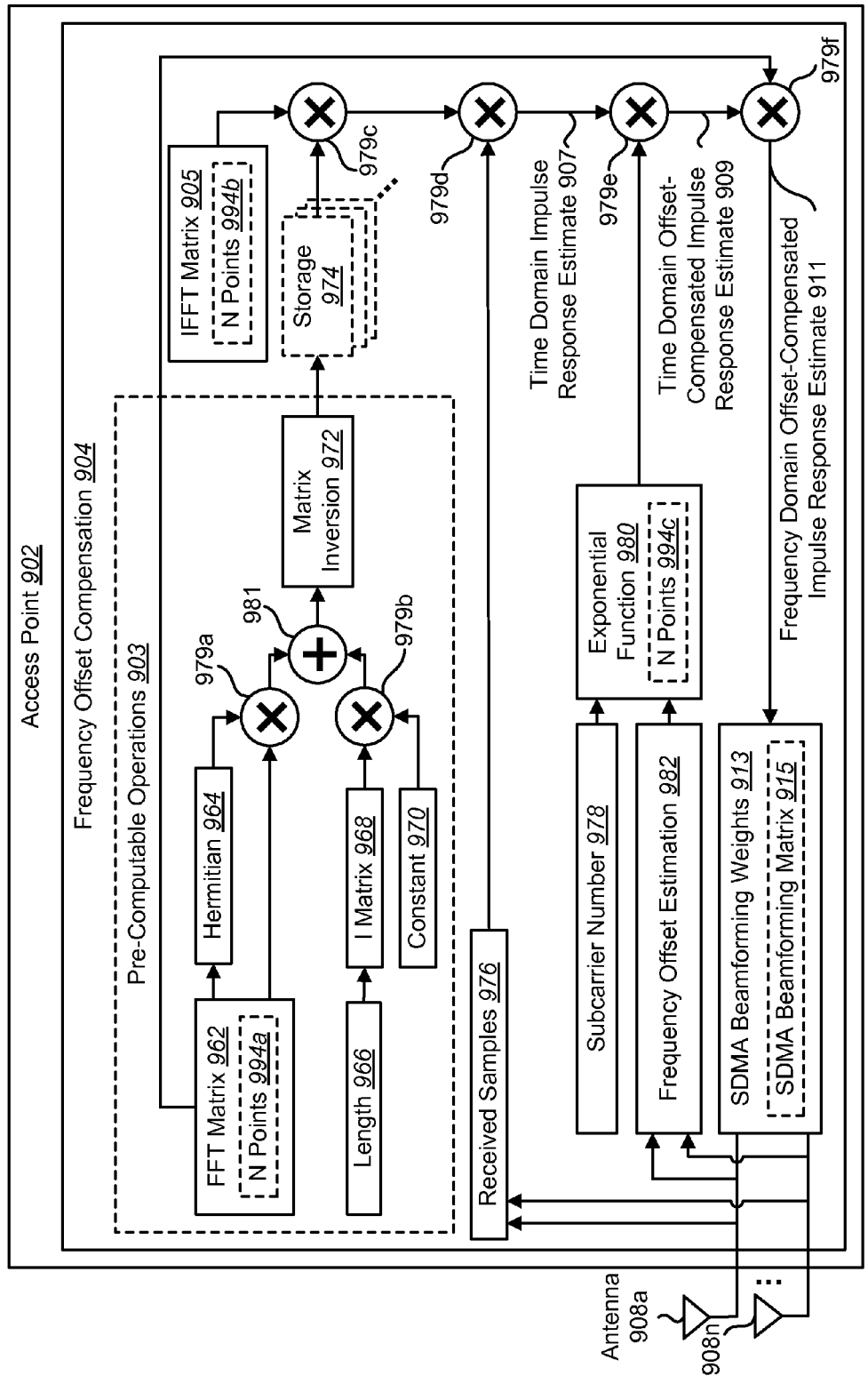
FIG. 9 is a block diagram illustrating another configuration of an access point where systems and methods for compensating for frequency offsets on a base station may be implemented.

FIG. 9 is a block diagram illustrating another configuration of an access point 902 where systems and methods for compensating for frequency offsets on a base station may be implemented. In particular, FIG. 9 illustrates one implementation of the method 800 discussed in connection with FIG. 8. An access point 902 may include a frequency offset compensation module 904.

The frequency offset compensation module 904 may include an identity matrix 968 (e.g., I) of a certain length 966 (e.g., L). The identity matrix 968 may be multiplied 979b by a constant 970 (e.g., α). The frequency offset compensation module 904 may include an FFT matrix 962. The FFT matrix 962 may be an N-point 994a FFT matrix. The access point 902 may compute the Hermitian 964 of the FFT matrix 962 and multiply 979a it by the FFT matrix 962. The resulting product may be added 981 to the product of the identity matrix 968 and the constant 970. The resulting sum may be inverted by the matrix inversion module 972.

The resulting pre-computable matrix (e.g., $(F_{ij}^H F_{ij}+\alpha I_L)^{-1}$) may optionally be stored in storage 974. This pre-computable matrix may be the result of pre-computable operations 903. That is, the pre-computable matrix may optionally be pre-computed and pre-stored in storage 974, for example, before the access point 902 attempts to communicate with an access terminal (e.g., wireless communication device) 124. Additionally, the pre-computable operations 903 may be performed on the access point 902 or on some other separate computing device with the resulting inverted matrix being placed in storage 974 for use when the access point 902 is communicating with an access terminal. Several different modes may be pre-stored in storage 974 as discussed above in connection with FIG. 7. Alternatively, the pre-computable operations 903 may not be performed beforehand and/or stored, but may be performed when the access point 902 is communicating with an access terminal.

The resulting pre-computable matrix may be multiplied 979c with an N-point 994b IFFT matrix 905 (e.g., $F^{-1}$) and multiplied 979d with the received samples 976 (e.g., $H(f_k+\Delta f)$) in order to produce a time domain impulse response estimate 907 (e.g., $h_s$). The foregoing operations may be performed as illustrated by Equation (4) above.

The access point 902 may receive samples 976 (e.g., from one or more access terminals) using one or more antennas 908a-n. A frequency offset estimation module 982 may compute one or more frequency offset estimates (e.g., $\Delta f$) using the received samples 976. An exponential function 980

$$\left(e.g., \exp\left(\frac{-j2\pi k\Delta f}{N}\right)\right)$$

may use the one or more frequency offset estimates, subcarrier numbers 978, and N points 994c. The output of the exponential function 980 may be multiplied 979e with the time domain impulse response estimate 907 to produce a time domain offset-compensated impulse response estimate 909 (e.g., h(k)). These operations may be performed as illustrated by Equation (2) above.

The time domain offset-compensated impulse response estimate 909 may be multiplied 979f with the FFT matrix 962 in order to produce a frequency domain offset-compensated impulse response estimate 911 (e.g., $H_{est}$). This operation may be performed as illustrated by Equation (3) above. The frequency domain offset-compensated impulse response estimate 911 may be used to compute SDMA beamforming weights 913. For example, an SDMA beamforming matrix 915 may be computed using the frequency domain offset-compensated impulse response estimate 911. The SDMA beamforming weights 915 may be used to control signals transmitted to the access terminals using the antennas 908a-n.

Figure 10:
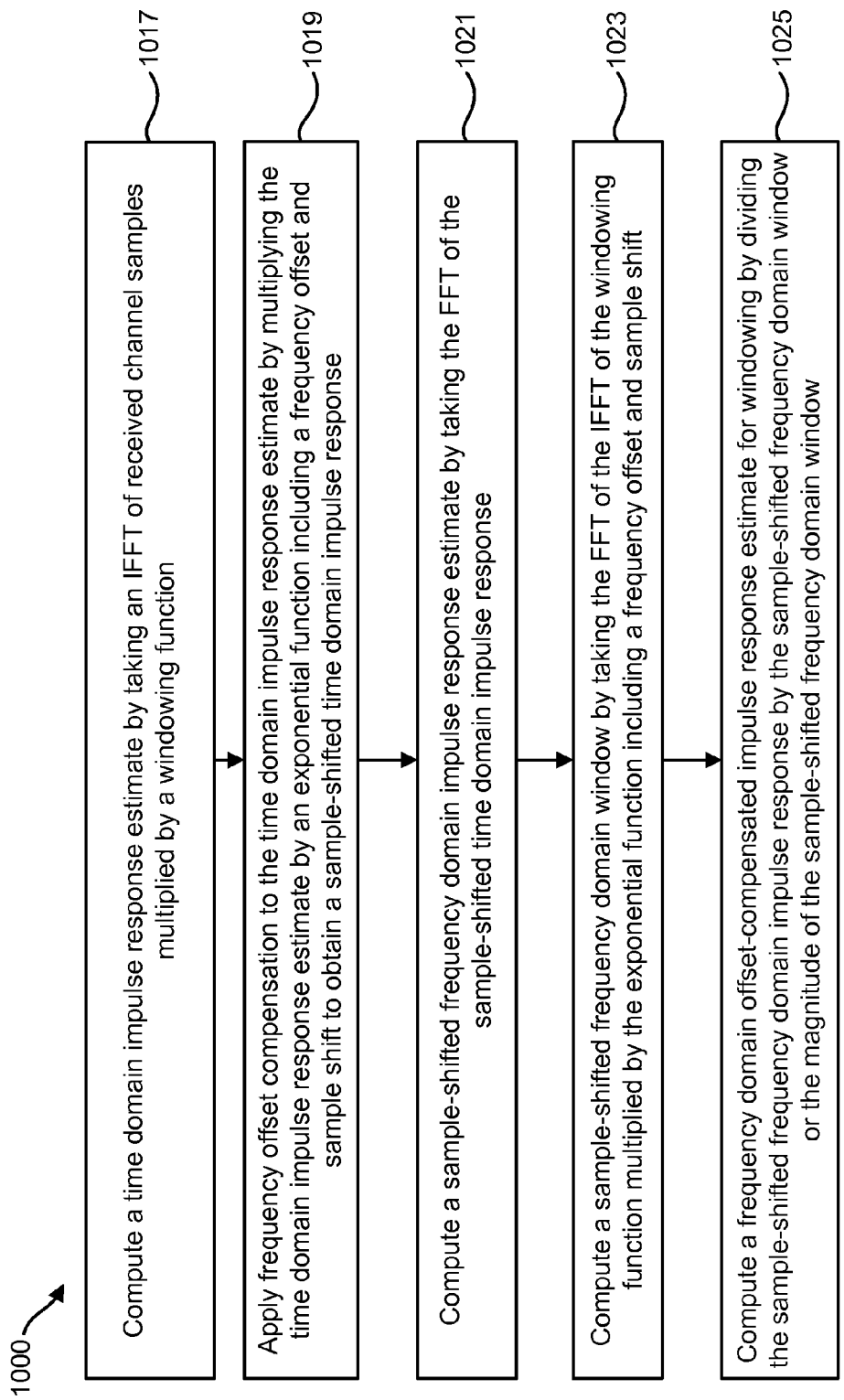
FIG. 10 is a flow diagram illustrating another configuration of a method for compensating for frequency offsets on a base station.

FIG. 10 is a flow diagram illustrating another more specific configuration of a method 600 for computing an offset-compensated impulse response estimate. More specifically, FIG. 10 illustrates an interpolation approach using only N-point FFTs and IFFTs. This approach may be beneficial, since there may be no need to store large minimum mean square error (MMSE) interpolation matrices on the base station 102. A base station 102 may compute 1017 a time domain impulse response estimate by taking an IFFT of received channel samples multiplied by a windowing function. This operation may be performed as illustrated in Equation (5).

$$h_s = IFFT\{H(f_k + \Delta f)W(f_k)\} \quad (5)$$

IFFT{H} is an N-point Inverse Fast Fourier Transform (IFFT) and W(f) is a windowing function with a roll-off at the band edges and around Direct Current (DC). One example of the windowing function is a raised cosine window for a 20 MHz channel with roll-off length intervals of eight samples. Larger roll-off values are possible, but may make an inversion more difficult by having smaller window values. Another example (e.g., for 40 MHz) may use the same roll-off length (i.e., eight samples) but may use more ones to cover 114 tones.

The base station 102 may apply 1019 frequency offset compensation to the time domain impulse response estimate by multiplying the time domain impulse response estimate by an exponential function including a frequency offset and sample shift to obtain a sample-shifted time domain impulse response. This operation may be performed as illustrated in Equation (6).

$$h(k) = h_s(k)\exp\left(\frac{-j2\pi\left(k - \frac{N}{2}\right)\Delta f}{N}\right) \quad (6)$$

The N/2 sample shift may be included to ensure that the phase discontinuity in the phase slope correction is outside the band instead of around Direct Current (DC). This may help avoid Gibbs distortion when taking an FFT of h.

The base station 102 may compute 1021a sample-shifted frequency domain impulse response estimate by taking the FFT of the sample-shifted time domain impulse response. This operation may be performed as illustrated in Equation (7).

$$H_s(f) = FFT\{h\} \quad (7)$$

The base station 102 may compute 1023 a sample-shifted frequency domain window by taking the FFT of the IFFT of the windowing function multiplied by an exponential function including a frequency offset and sample shift. This operation may be performed as illustrated in Equation (8).

$$W_s(f) = FFT\left\{IFFT(W(k))\exp\left(\frac{-j2\pi\left(k - \frac{N}{2}\right)\Delta f}{N}\right)\right\} \quad (8)$$

The base station 102 may compute 1025 a frequency domain offset-compensated impulse response estimate for windowing by dividing the sample-shifted frequency domain impulse response estimate by the sample-shifted frequency domain window or the magnitude of the sample-shifted frequency domain window. This operation may be performed as illustrated in Equation (9) or Equation (10).

$$H_{est}(k) = \frac{H_s(k)}{W_s(k)} = \frac{H_s(k)W_s^*(k)}{|W_s(k)|^2} \quad (9)$$

As described above, the sample-shifted frequency domain impulse response estimate may be divided alternatively by the magnitude of the sample-shifted frequency domain window. This operation may be performed as illustrated in Equation (10).

$$H_{est}(k) = \frac{H_s(k)}{|W_s(k)|} \quad (10)$$

This may be a simpler alternative to correct for windowing. However, it may also leave a phase bias per access terminal (e.g., "client") that is constant across all base station 102 antennas 108a-n and subcarriers 116a-n, which may not affect performance.

Figure 11:
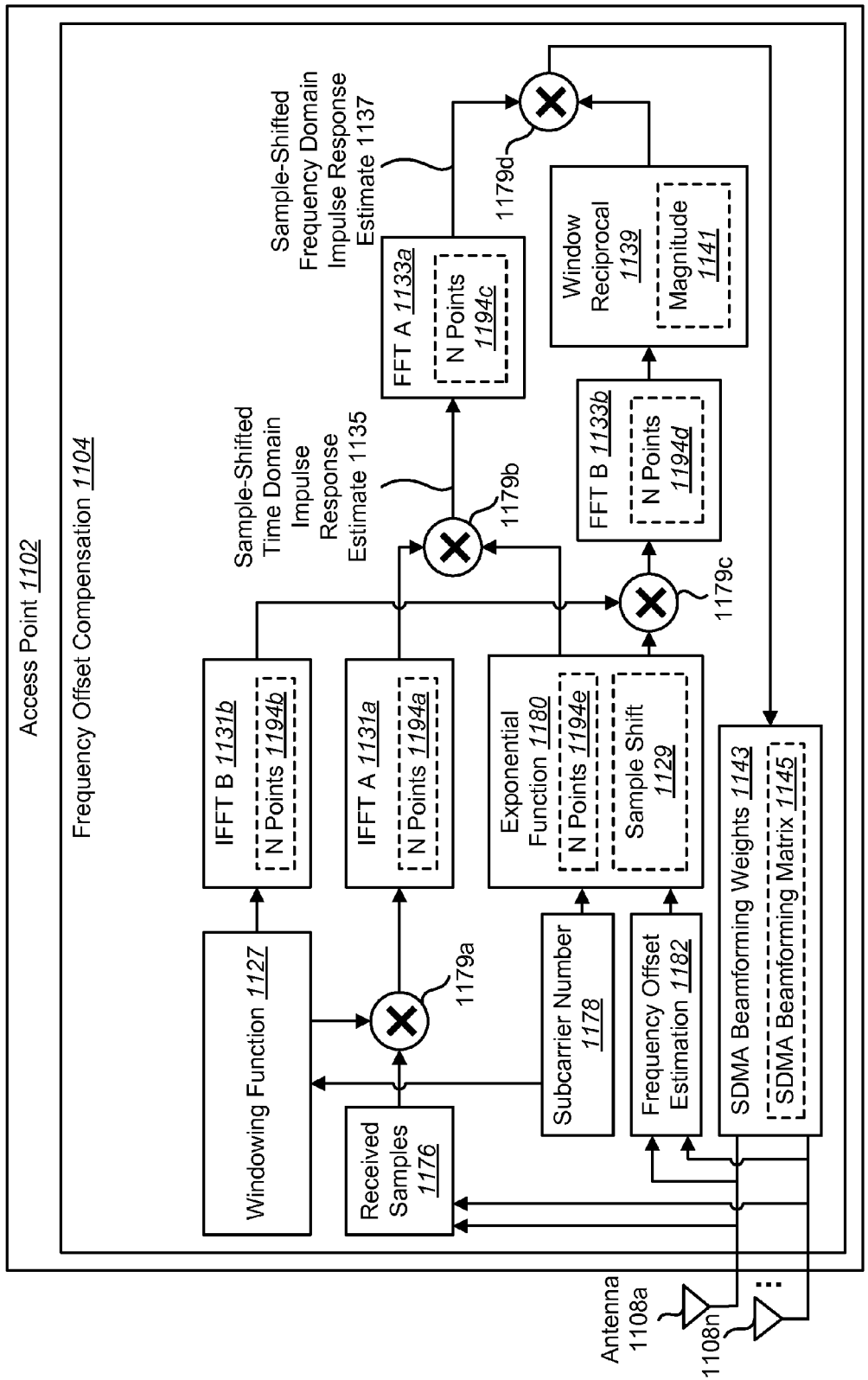
FIG. 11 is a block diagram illustrating an access point where systems and methods for compensating for frequency offsets on a base station may be implemented.

FIG. 11 is a block diagram illustrating an access point 1102 where systems and methods for compensating for frequency offsets on a base station 102 may be implemented. In particular, FIG. 11 illustrates one implementation of the method 1000 discussed in connection with FIG. 10. An access point 1102 may include a frequency offset compensation module 1104. An N-point 1194a IFFT A 1131a may be taken of the product of the received samples 1176 (e.g., $H(f_k + \Delta f)$) multiplied 1179a with a windowing function 1127 (e.g., W(k), which may use subcarrier numbers 1178) to produce a time domain impulse response estimate 120. This operation may be performed as illustrated in Equation (5) above.

The frequency offset estimation module 1182 may estimate one or more frequency offsets (e.g., $\Delta f$) using the signal received by the antennas 1108a-n. An exponential function 1180 may use the frequency offset estimate(s), subcarrier numbers 1178, N points 1194e and a sample shift 1129 (e.g., N/2). The time domain impulse response estimate may be multiplied 1179b by the exponential function 1180 output to produce a sample-shifted time domain impulse response estimate 1135 (e.g., h(k)). This operation may be performed as illustrated by Equation (6) above. The access point 1102 may take an N-point 1194c FFT A 1133a of the sample-shifted time domain impulse response estimate 1135 to produce a sample-shifted frequency domain impulse response estimate 1137 (e.g., $H_s(f)$). This operation may be performed as illustrated by Equation (7) above.

The access point 1102 may take an N-point 1194*d* FFT B 1133*b* of the product of an N-point 1194*b* IFFT B 1131*b* of the windowing function 1127 (e.g., IFFT(W(k))) multiplied 1179*c* with the output of the exponential function 1180 including a frequency offset and sample shift 1129

$$\left(e.g., \exp\left(\frac{-j2\pi\left(k - \frac{N}{2}\right)\Delta f}{N}\right)\right)$$

to produce a frequency shifted window (e.g., $W_s(f)$). This operation may be performed as illustrated by Equation (8) above.

The access point 1102 may take the reciprocal 1139 of the frequency-shifted window. In other words, the access point 1102 may use the conjugate of the frequency-shifted window divided by the magnitude 1141 of the frequency-shifted window squared. In one configuration, the access point 1102 may take the element-wise inverse of the frequency-shifted window. The frequency-shifted window may be a vector, and the access point 1102 may obtain the inverse of the frequency-shifted window by taking 1 divided by each element of the vector. The sample-shifted frequency domain impulse response estimate 1137 may be multiplied 1179*d* by the reciprocal of the frequency shifted window (e.g., divided by frequency shifted window) to produce a frequency domain offset-compensated impulse response estimate (e.g., $H_{est}(k)$). This operation may be performed as illustrated in Equation (9) above. Alternatively, the sample-shifted frequency domain impulse response estimate 1137 may be divided by the magnitude 1141 of the frequency shifted window. This approach may leave a phase bias per access terminal. This operation may be performed as illustrated by Equation (10) above.

The access point 1102 may use the frequency domain offset-compensated (i.e., channel) impulse response estimate to compute SDMA beamforming weights 1143 (e.g., to compute an SDMA beamforming matrix 1145). The SDMA beamforming weights 1143 may be used to transmit data using the antennas 1108*a-n* on the access point 1102.

Figure 12:
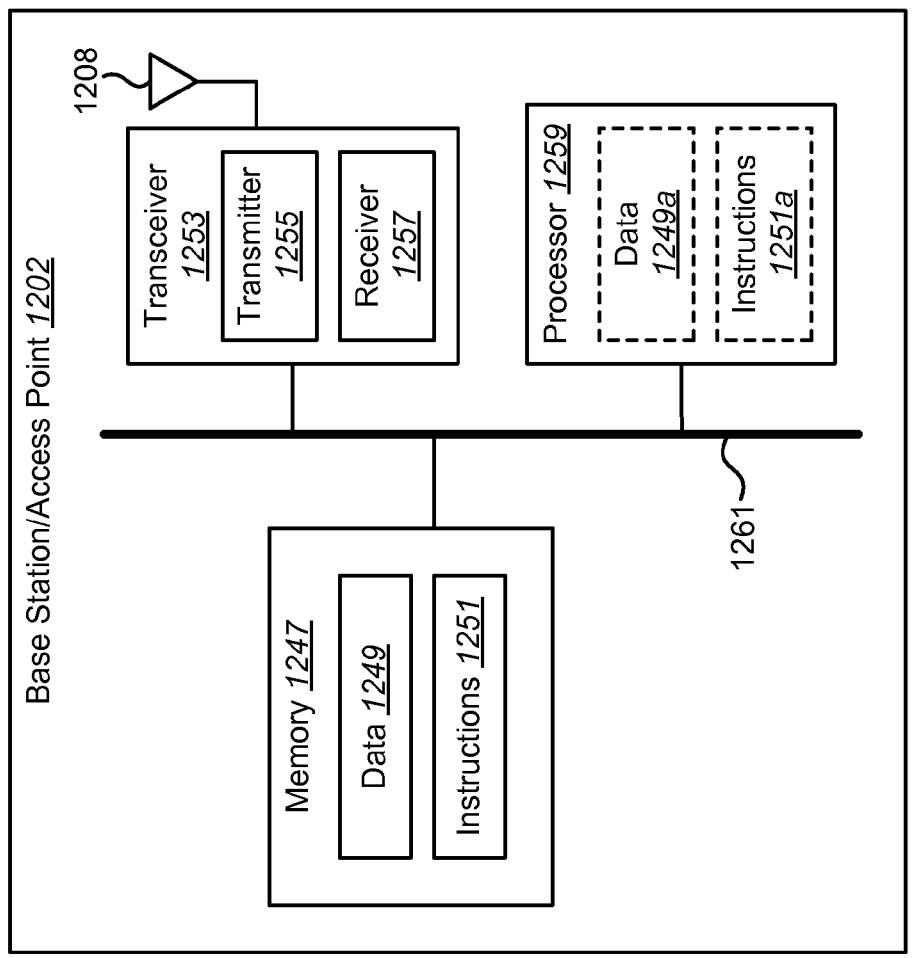
FIG. 12 illustrates certain components that may be included within a base station or access point.

FIG. 12 illustrates certain components that may be included within a base station or access point 1202. The base stations 102, 202, 302 or access points 702, 902, 1102 discussed previously may be configured similarly to the base station or access point 1202 shown in FIG. 12.

The base station or access point 1202 includes a processor 1259. The processor 1259 may be a general purpose single- or multi-chip microprocessor (e.g., an ARM), a special purpose microprocessor (e.g., a digital signal processor (DSP)), a microcontroller, a programmable gate array, etc. The processor 1259 may be referred to as a central processing unit (CPU). Although just a single processor 1259 is shown in the base station or access point 1202 of FIG. 12, in an alternative configuration, a combination of processors (e.g., an ARM and DSP) could be used.

The base station or access point 1202 also includes memory 1247 in electronic communication with the processor 1259 (i.e., the processor 1259 can read information from and/or write information to the memory 1247). The memory 1247 may be any electronic component capable of storing electronic information. The memory 1247 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1249 and instructions 1251 may be stored in the memory 1247. The instructions 1251 may include one or more programs, routines, sub-routines, functions, procedures, etc. The instructions 1251 may include a single computer-readable statement or many computer-readable statements. The instructions 1251 may be executable by the processor 1259 to implement the methods disclosed in connection with the access point 102, base station or communication device. Executing the instructions 1251 may involve the use of the data 1249 that is stored in the memory 1247. FIG. 12 shows some instructions 1251*a* and data 1249*a* being loaded into the processor 1259.

The base station or access point 1202 may also include a transmitter 1255 and a receiver 1257 to allow transmission and reception of signals between the base station or access point 1202 and a remote location (e.g., a wireless communication device 124 or access terminal). The transmitter 1255 and receiver 1257 may be collectively referred to as a transceiver 1253. An antenna 1208 may be electrically coupled to the transceiver 1253. The base station or access point 1202 may also include (not shown) multiple transmitters, multiple receivers, multiple transceivers and/or multiple antenna.

The various components of the base station or access point 1202 may be coupled together by one or more buses, which may include a power bus, a control signal bus, a status signal bus, a data bus, etc. For simplicity, the various buses are illustrated in FIG. 12 as a bus system 1261.

Figure 13:
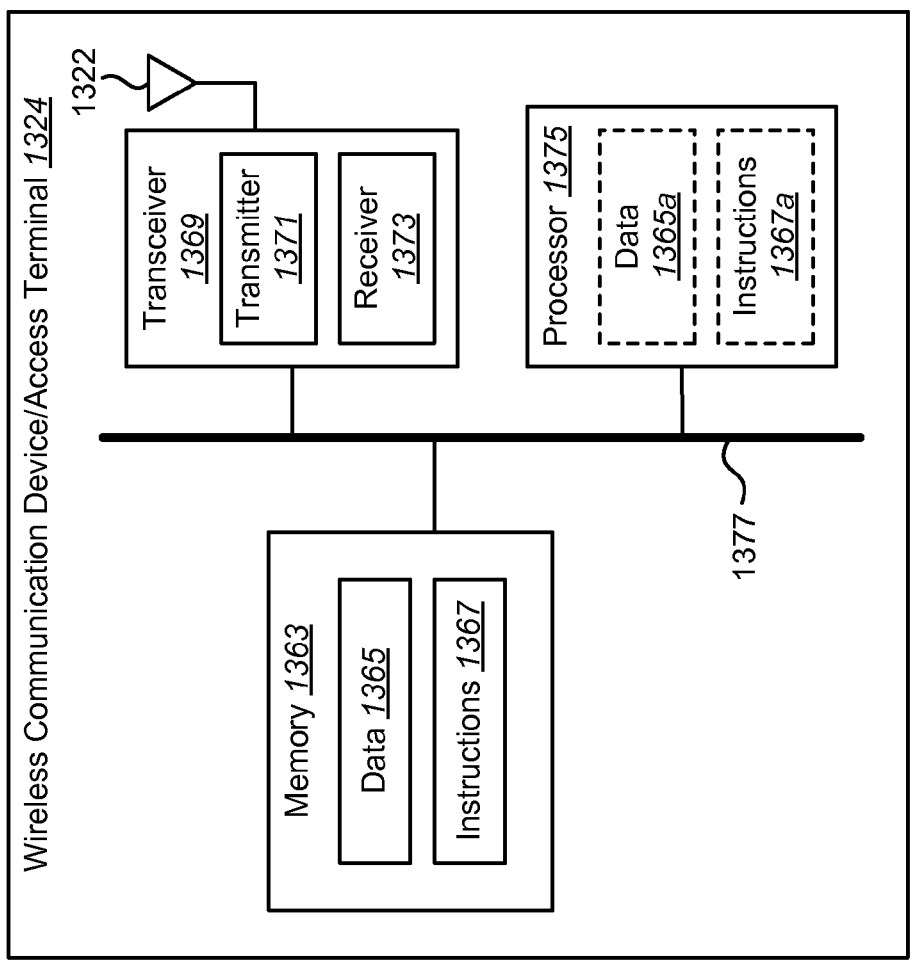
FIG. 13 illustrates certain components that may be included within a wireless communication device or access terminal.

FIG. 13 illustrates certain components that may be included within a wireless communication device or access terminal 1324. The wireless communication devices 124, 224, 324 or access terminals discussed previously may be configured similarly to the wireless communication device or access terminal 1324 that is shown in FIG. 13.

The wireless communication device or access terminal 1324 includes a processor 1375. The processor 1375 may be a general purpose single- or multi-chip microprocessor (e.g., an ARM), a special purpose microprocessor (e.g., a digital signal processor (DSP)), a microcontroller, a programmable gate array, etc. The processor 1375 may be referred to as a central processing unit (CPU). Although just a single processor 1375 is shown in the wireless communication device or access terminal 1324 of FIG. 13, in an alternative configuration, a combination of processors (e.g., an ARM and DSP) could be used.

The wireless communication device or access terminal 1324 also includes memory 1363 in electronic communication with the processor 1375 (i.e., the processor 1375 can read information from and/or write information to the memory 1363). The memory 1363 may be any electronic component capable of storing electronic information. The memory 1363 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1365 and instructions 1367 may be stored in the memory 1363. The instructions 1367 may include one or more programs, routines, sub-routines, functions, procedures, etc. The instructions 1367 may include a single computer-readable statement or many computer-readable statements. The instructions 1367 may be executable by the processor 1375 to implement the methods that were described above in connection with the wireless communication devices 124 or access terminals. Executing the instructions 1367 may involve the use of the data 1365 that is stored in the memory 1363. FIG. 13 shows some instructions 1367a and data 1365a being loaded into the processor 1375.

The wireless communication device or access terminal 1324 may also include a transmitter 1371 and a receiver 1373 to allow transmission and reception of signals between the wireless communication device or access terminal 1324 and a remote location (e.g., a base station 102 or access point). The transmitter 1371 and receiver 1373 may be collectively referred to as a transceiver 1369. An antenna 1322 may be electrically coupled to the transceiver 1369. The wireless communication device or access terminal 1324 may also include (not shown) multiple transmitters, multiple receivers, multiple transceivers and/or multiple antenna.

The various components of the wireless communication device or access terminal 1324 may be coupled together by one or more buses, which may include a power bus, a control signal bus, a status signal bus, a data bus, etc. For simplicity, the various buses are illustrated in FIG. 13 as a bus system 1377.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The terms "processor-readable medium" and "computer-readable medium" refer to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A base station for compensating for frequency offsets, comprising:
 a processor;
 memory in electronic communication with the processor;
 instructions stored in the memory, the instructions being executable to:
  compute a time domain impulse response estimate;
  apply frequency offset compensation to the time domain impulse response estimate to obtain a time domain offset-compensated impulse response estimate;
  compute a frequency domain offset-compensated impulse response estimate;
  compute beamforming weights using the frequency domain offset-compensated impulse response estimate;
  form at least one beam using the beamforming weights; and
  transmit data using the at least one beam.

2. The base station of claim 1, wherein the beamforming weights are used for Spatial Division Multiple Access (SDMA).

3. The base station of claim 1, wherein the base station is an access point.

4. The base station of claim 1, further comprising one or more antennas.

5. The base station of claim 1, wherein the instructions are further executable to discover one or more wireless communication devices.

6. The base station of claim 1, wherein the data is transmitted to one or more access terminals.

7. The base station of claim 1, wherein the instructions are further executable to receive one or more channel samples with one or more frequency offsets.

8. The base station of claim 1, wherein computing a time domain impulse response estimate comprises multiplying the inverse of the Hermitian of a Fast Fourier Transform (FFT) matrix multiplied by the FFT matrix plus a constant multiplied by an identity matrix with the Hermitian of the FFT matrix and received channel samples.

9. The base station of claim 1, wherein applying frequency offset compensation to the time domain impulse response estimate comprises multiplying the time domain impulse response estimate by an exponential function including a frequency offset.

10. The base station of claim 1, wherein computing a frequency domain offset-compensated impulse response estimate comprises multiplying the time domain offset-compensated impulse response estimate with a Fast Fourier Transform (FFT) matrix.

11. The base station of claim 1, wherein computing the time domain impulse response estimate comprises multiplying the inverse of the Hermitian of a Fast Fourier Transform (FFT) matrix multiplied by the FFT matrix plus a constant multiplied by an identity matrix with an Inverse Fast Fourier Transform (IFFT) matrix and received channel samples.

12. The base station of claim 1, wherein computing a time domain impulse response estimate comprises taking an Inverse Fast Fourier Transform (IFFT) of received channel samples multiplied by a windowing function.

13. The base station of claim 12, wherein applying frequency offset compensation to the time domain impulse response estimate comprises multiplying the time domain impulse response estimate by an exponential function including a frequency offset and sample shift to obtain a sample-shifted time domain impulse response.

14. The base station of claim 13, wherein computing the frequency domain offset-compensated impulse response estimate comprises:
   computing a sample-shifted frequency domain impulse response estimate by taking the Fast Fourier Transform (FFT) of the sample-shifted time domain impulse response;
   computing a sample-shifted frequency domain window by taking the FFT of the IFFT of the windowing function multiplied by the exponential function including a frequency offset and sample shift; and
   computing a frequency domain offset-compensated impulse response estimate for windowing by dividing the sample-shifted frequency domain impulse response by the sample-shifted frequency domain window.

15. The base station of claim 13, wherein computing the frequency domain offset-compensated impulse response estimate comprises:
   computing a sample-shifted frequency domain impulse response estimate by taking the Fast Fourier Transform (FFT) of the sample-shifted time domain impulse response;
   computing a sample-shifted frequency domain window by taking the FFT of the IFFT of the windowing function multiplied by the exponential function including a frequency offset and sample shift; and
   computing a frequency domain offset-compensated impulse response estimate for windowing by dividing the sample-shifted frequency domain impulse response by the magnitude of the sample-shifted frequency domain window.

16. A method for compensating for frequency offsets on a base station, comprising:
   computing, on a base station, a time domain impulse response estimate;
   applying, on the base station, frequency offset compensation to the time domain impulse response estimate to obtain a time domain offset-compensated impulse response estimate;
   computing, on the base station, a frequency domain offset-compensated impulse response estimate;
   computing, on the base station, beamforming weights using the frequency domain offset-compensated impulse response estimate;
   forming, on the base station, at least one beam using the beamforming weights; and
   transmitting data using the at least one beam from the base station.

17. The method of claim 16, wherein the beamforming weights are used for Spatial Division Multiple Access (SDMA).

18. The method of claim 16, wherein the base station is an access point.

19. The method of claim 16, wherein the base station uses one or more antennas.

20. The method of claim 16, wherein the instructions are further executable to discover one or more wireless communication devices.

21. The method of claim 16, wherein the data is transmitted to one or more access terminals.

22. The method of claim 16, further comprising, receiving one or more channel samples with one or more frequency offsets.

23. The method of claim 16, wherein computing a time domain impulse response estimate comprises multiplying the inverse of the Hermitian of a Fast Fourier Transform (FFT) matrix multiplied by the FFT matrix plus a constant multiplied by an identity matrix with the Hermitian of the FFT matrix and received channel samples.

24. The method of claim 16, wherein applying frequency offset compensation to the time domain impulse response estimate comprises multiplying the time domain impulse response estimate by an exponential function including a frequency offset.

25. The method of claim 16, wherein computing a frequency domain offset-compensated impulse response estimate comprises multiplying the time domain offset-compensated impulse response estimate with a Fast Fourier Transform (FFT) matrix.

26. The method of claim 16, wherein computing the time domain impulse response estimate comprises multiplying the inverse of the Hermitian of a Fast Fourier Transform (FFT) matrix multiplied by the FFT matrix plus a constant multiplied by an identity matrix with an Inverse Fast Fourier Transform (IFFT) matrix and received channel samples.

27. The method of claim 16, wherein computing a time domain impulse response estimate comprises taking an Inverse Fast Fourier Transform (IFFT) of received channel samples multiplied by a windowing function.

28. The method of claim 27, wherein applying frequency offset compensation to the time domain impulse response estimate comprises multiplying the time domain impulse response estimate by an exponential function including a frequency offset and sample shift to obtain a sample-shifted time domain impulse response.

29. The method of claim 28, wherein computing the frequency domain offset-compensated impulse response estimate comprises:
   computing a sample-shifted frequency domain impulse response estimate by taking the Fast Fourier Transform (FFT) of the sample-shifted time domain impulse response;
   computing a sample-shifted frequency domain window by taking the FFT of the IFFT of the windowing function multiplied by the exponential function including a frequency offset and sample shift; and
   computing a frequency domain offset-compensated impulse response estimate for windowing by dividing the sample-shifted frequency domain impulse response by the sample-shifted frequency domain window.

30. The method of claim 28, wherein computing the frequency domain offset-compensated impulse response estimate comprises:
   computing a sample-shifted frequency domain impulse response estimate by taking the Fast Fourier Transform (FFT) of the sample-shifted time domain impulse response;
   computing a sample-shifted frequency domain window by taking the FFT of the IFFT of the windowing function multiplied by the exponential function including a frequency offset and sample shift; and computing a frequency domain offset-compensated impulse response estimate for windowing by dividing the sample-shifted frequency domain impulse response by the magnitude of the sample-shifted frequency domain window.

31. A computer-program product for compensating for frequency offsets on a base station, the computer-program product comprising a non-transitory computer-readable medium having instructions thereon, the instructions comprising:

code for computing a time domain impulse response estimate;

code for applying frequency offset compensation to the time domain impulse response estimate to obtain a time domain offset-compensated impulse response estimate;

code for computing a frequency domain offset-compensated impulse response estimate;

code for computing beamforming weights using the frequency domain offset-compensated impulse response estimate;

code for forming at least one beam using the beamforming weights; and code for transmitting data using the at least one beam.

32. An apparatus for compensating for frequency offsets, comprising:

means for computing a time domain impulse response estimate;

means for applying frequency offset compensation to the time domain impulse response estimate to obtain a time domain offset-compensated impulse response estimate;

means for computing a frequency domain offset-compensated impulse response estimate;

means for computing beamforming weights using the frequency domain offset-compensated impulse response estimate;

means for forming at least one beam using the beamforming weights; and means for transmitting data using the at least one beam.

* * * * *